Oct. 1, 1946.　　　　W. MAUCH　　　　2,408,567
TOOL HOLDER
Filed May 12, 1944
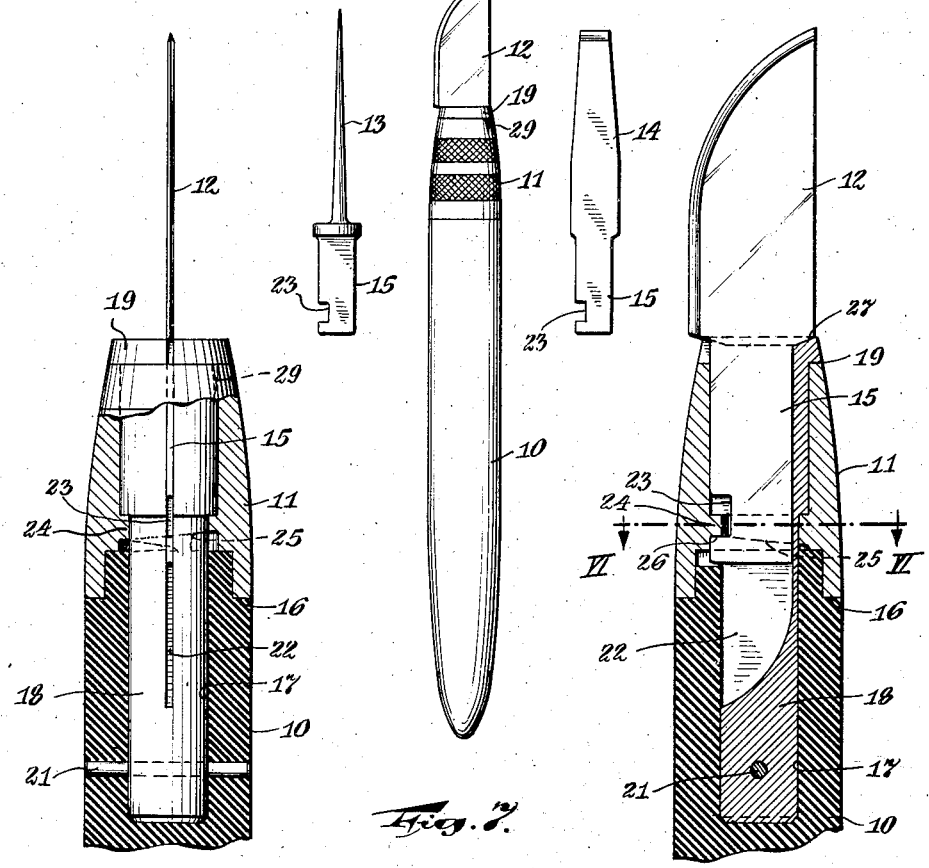
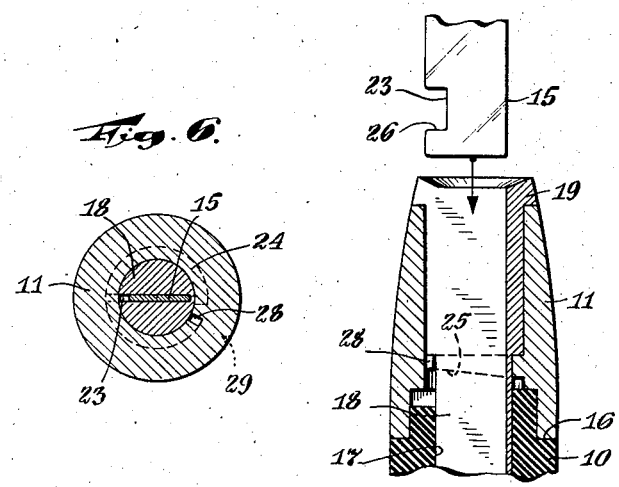
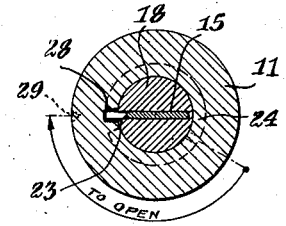
INVENTOR
WILLY MAUCH.
BY
ATTORNEY Patented Oct. 1, 1946

2,408,567

UNITED STATES PATENT OFFICE 2,408,567

TOOLHOLDER

Willy Mauch, Bridgeport, Conn., assignor to Bruner-Ritter, Inc., New York, N. Y., a corporation of New York Application May 12, 1944, Serial No. 535,375

6 Claims. (Cl. 279—93)

The present invention relates to means for attaching knife blades or other tools to a handle or tool receiving member.

It is an object of the invention to provide a tool holder equipped with mechanism whereby a simple operation will enable the user to substitute one tool for another.

Another object of the invention is to provide a holder with means to receive and hold the shank of a tool in fixed relation to the holder.

Another object of the invention is to provide tool gripping means so constructed and arranged as to maintain an effective hold or grip a tool irrespective of change in surface wear to which the contacting holding parts are subjected.

Other objects and advantages of the invention will be more clearly understood from the following description together with the accompanying drawing, in which, Fig. 1 is a side view of a holder with a tool in place constructed in accordance wtih the present invention.

Fig. 2 is one example of a tool such as an awl to be used with the present holder.

Fig. 3 is another example of a tool such as a screw driver to be used in the present holder.

Fig. 4 is a fragmentary view partly in cross-section showing means for holding a tool.

Fig. 5 is a view similar to Fig. 4 but showing a side view of a tool held in the holder.

Fig. 6 is a view taken on line VI—VI in Fig. 5.

Fig. 7 is a view showing the end of the holder in cross-section with the tool shank ready to be applied, and Fig. 8 is a view similar to that shown in Fig. 6 but with the parts in position to release the tool.

The present embodiment of the invention comprises, what may be termed a holder or tool-receiving member which comprises a grip-piece 10 including a ferrule 11 capable of receiving and tightly securing a tool such as a knife-blade 12, an awl 13, a screw-driver 14 or other tool provided with a shank 15 so constructed as to be gripped by mechanism to be hereinafter described.

The grip-piece 10 has one end provided with a shoulder 16 to receive one end of the ferrule 11 and a bore 17 to receive one end of a slotted-rod 18. The rod 18 is provided with a collar 19 to hold the ferrule 11 rotatably in place. The rod 18 may be held in the grip-piece by a forced fit or by a pin 21. A slot 22 is provided at one side of the rod 18 to receive the shank 15 of a tool which shank is provided with a notch 23. The shank 15 as shown is of a width greater than the depth of the slot of the slotted-rod 18. An edge or portion of the shank therefore extends beyond the slot to provide for the notch 23 one side of which constitutes a projection or lug.

The ferrule 11 has an interiorly projecting collar 24 having one surface 25 inclined or of cam formation providing what may be termed a cam-collar to engage with surface 26 of notch 23. Although the surface 26 in the present construction constitutes the lower side of the notch 23 it is obvious that a contact surface may be provided in the form of a shoulder or extended portion to provide a lug not necessarily part of the notch. Thus when a tool has been inserted into the holder the ferrule 11 is rotated to move the cam surface in contact with the surface 26 of the notch and as the ferrule is rotated the tool is forced tightly into place bringing a ledge 27 of the tool firmly against the upper end of the rod 18.

The cam-collar 24 extends around the inner surface of the ferrule except at one point (see Fig. 8) to provide a slot 28 to admit the passage of the shank 15. The position of the slot 28 is indicated by a marker 29 (see Fig. 1) so that the user may determine when the slot 28 is in registry with the slot 22 of the rod 18. When the ferrule is positioned to line the marker 29 with the slot of the rod 18 the shank 15 of the blade will pass the cam-collar and a subsequent rotation of the ferrule will move the cam collar into contact with the cam-surface or lug extending from the slot 22 thereby holding the tool in place. A reverse movement of the ferrule to bring the marker in line with the slot in the rod permits the removal of the tool.

In devices of the present type it is necessary to frequently remove one tool and insert another. The tools and particularly the shanks thereof are therefore subject to considerable wear. Any play or looseness of a tool of this type is highly undesirable and heretofore when such wear occurred a new tool was required since the shank of the tool is the part most subject to wear. In the present construction, although the repeated tightening and releasing of a tool may cause the contacting or gripping surfaces to wear, the extended take-up provided by the cam collar makes it possible to hold the tool at new contacting surfaces as wear takes place. The present novel arrangement of corelated parts therefore serves to provide a holder giving long service without loss in effectiveness to perform its intended function.

Although a preferred embodiment of the invention is shown and described herein, it is to be

I claim:

1. In combination with a tool holder having a slot, a tool having a flat shank, an edge of said shank extending from said slot, said edge having a notch, a rotatable-member, a cam surface carried by said rotatable-member for engaging one surface of said notch to hold said tool in said holder.

2. In combination with a tool receiving member having a slot to receive a tool shank, a tool having a shank to enter said slot, one portion of said shank extending from said slot, said portion being provided with a notch, a ferrule carried by said member, a collar carried by said ferrule and movable therewith to enter said notch to hold said tool in said member.

3. A tool holder comprising a rod having a slot to receive a flat tool shank, said rod having portions thereof of different diameters, one edge of said shank extending from said slot in the smaller diameter portion of said rod, a rotatable-member movable about the larger diameter portion of said rod, and a cam surface carried by said rotatable-member for engaging said edge to secure the tool in said holder.

4. A tool holder to receive a tool shank provided with a notch, comprising a rod having portions of different diameters and having a longitudinal slot to receive said tool shank, a ferrule rotatable about the larger diameter portion of said rod, a cam mounted in said ferrule and rotatable therewith about said rod, the slot in said smaller portion of said rod being of less depth than the width of said shank to position a portion of said shank in contact with said cam when said ferrule is rotated to move said cam in the notch of said shank.

5. A tool holder to receive a tool shank provided with a notch and a ledge portion, comprising a rod-member having portions thereof of different diameters and having a slot extending longitudinally thereof to receive said tool shank, a ferrule rotatable about the larger diameter portion of said rod-member, said tool shank having a width greater than the depth of the slot in the smaller diameter portion of said rod-member to position the notch beyond the perimeter of said rod-member, an annular cam member carried by said ferrule, said cam being positioned to be moved in the notch of said shank and having a cam surface inclined to engage an edge of said notch to move the shank relative to said rod-member and engage said ledge with one end of said rod-member to firmly anchor the tool in position.

6. A holder to receive and grip a tool shank having a notch, comprising a rod-member, a ferrule, one portion of said rod-member having an outside diameter slightly less than the inside diameter of said ferrule to serve as a bearing for said ferrule, another portion of said rod-member being of a lesser diameter, an annular member having a cam surface integral with said ferrule and positioned around said last mentioned portion of said rod-member, a slot longitudinally of said rod-member, a slot in said cam member adjacent to one end of said cam surface, indicating means on said ferrule to indicate when said slots are in alignment for the passage of a tool along said slot to position one edge of said notch for contact with said cam surface when said ferrule is rotated.

WILLY MAUCH.